United States Patent
Simard et al.

(10) Patent No.: US 7,239,807 B2
(45) Date of Patent: Jul. 3, 2007

(54) VARIABLE CLAMP EQUALIZATION METHOD AND APPARATUS

(75) Inventors: Frederic F. Simard, Nepean (CA); Emmanuel Seitelbach, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1005 days.

(21) Appl. No.: 10/067,351

(22) Filed: Feb. 7, 2002

(65) Prior Publication Data
US 2004/0208517 A1 Oct. 21, 2004

(51) Int. Cl.
H04B 10/08 (2006.01)
H04B 17/00 (2006.01)
H04B 10/17 (2006.01)
H04J 14/02 (2006.01)

(52) U.S. Cl. .......................... 398/26; 398/34; 398/37; 398/97; 398/177

(58) Field of Classification Search .................. None
See application file for complete search history.

(56) References Cited

U.S. PATENT DOCUMENTS

| 5,812,710 | A | 9/1998 | Sugaya | |
|---|---|---|---|---|
| 5,815,299 | A | 9/1998 | Bayart et al. | |
| 6,204,945 | B1 * | 3/2001 | Iwata et al. | 398/9 |
| 6,404,523 | B1 * | 6/2002 | Morikawa et al. | 398/79 |
| 6,445,471 | B1 * | 9/2002 | Shimokawa et al. | 398/79 |
| 7,020,092 | B1 * | 3/2006 | Weiske et al. | 370/252 |
| 2001/0019436 | A1 * | 9/2001 | Nakajima et al. | 359/110 |
| 2002/0181061 | A1 * | 12/2002 | Uda et al. | 359/173 |

FOREIGN PATENT DOCUMENTS

WO  WO 25465 A1 * 5/2000

* cited by examiner

*Primary Examiner*—Kenneth Vanderpuye
*Assistant Examiner*—David S Kim

(57) ABSTRACT

The present invention relates to a variable clamp equalization method and apparatus, the method includes measuring optical signal to noise ratio (OSNR) values for each wavelength, computing a raw power adjustment value for each wavelength, computing a raw power adjustment correction factor for each computed raw power adjustment value based on a computed OSNR range value in accordance with a pre-defined variable clamp value schedule, wherein a larger clamp is scheduled for use when the computed OSNR range value is larger, and a smaller clamp is scheduled for use when the computed OSNR range value is smaller. The method further includes determining a clamped power adjustment value for each wavelength, applying the corresponding determined clamped power adjustment value to each wavelength, and iterating the aforementioned until the computed OSNR range value is within pre-defined boundaries, whereby the signal is considered equalized.

6 Claims, 5 Drawing Sheets

VARIABLE CLAMP EQUALIZATION METHOD AND APPARATUS

FIELD OF THE INVENTION

The present invention relates generally to optical fiber network performance, and more particularly to a variable clamp equalization method and apparatus.

BACKGROUND OF THE INVENTION

Today's optical fiber networks carry many channels over long distances. When a signal is transmitted via an optical fiber, the signal's power level degrades the longer the transmission distance becomes, as the incident photons interact with glass fiber molecules and/or with photons from adjacent wavelengths. Power level degradation is a significant challenge in maintaining optical fiber networks; manifesting as phenomena such as chromatic dispersion, self-phase modulation, four wave mixing, cross-phase modulation, stimulated brilloin scattering, stimulated raman scattering, and polarization mode distortion.

To compensate for power level degradation, nodes having light amplifiers are provided at predetermined intervals to amplify the signal before transmitting it on to the next fiber span. Existing methods of power level adjustment, or "equalization" as it is referred to in Dense Wave Division Multiplexing (DWDM) systems, involve a process whereby channels are individually adjusted using non-real time algorithms to optimize overall system performance.

Measured values for variables such as current channel input power, amplifier noise level, current transmission setting, optical signal to noise ratio (OSNR), and the like are input into an equalization algorithm. The output provides a resultant recommended equalization factor, or transmission power adjustment value.

The recommended transmission power adjustment value is typically capped by what is known in the industry as a "clamp". Existing clamps are fixed values that limit the maximum power adjustment on any given iteration of the algorithm. A large clamp will result in a fast, sub-optimal convergence, and a small clamp will result in a slow, optimal convergence, so that using a fast convergence of the equalization algorithm is typically at the expense of optimality, while optimal convergence of the algorithm is typically at the expense of speed.

The problem is that existing clamping methods are a compromise between optimality and speed. What is needed is a way to divorce these two conflicting objectives so that equalization can be performed with both optimality and speed.

For the foregoing reasons, there is a need for an improved method of equalization.

SUMMARY OF THE INVENTION

The present invention is directed to a variable clamp equalization method and apparatus. In accordance with the present invention, there is provided a variable clamp equalization method including the steps of (i) measuring optical signal to noise ratio (OSNR) values for each wavelength, (ii) computing an OSNR range value of the measured OSNR values, (iii) computing an OSNR average value of the measured OSNR values, (iv) computing a raw power adjustment value for each wavelength by subtracting each wavelength's measured OSNR value from the computed OSNR average value, and (v) computing a raw power adjustment correction factor for each computed raw power adjustment value based on the computed OSNR range value in accordance with a pre-defined variable clamp value schedule, wherein a larger clamp is scheduled for use when the computed OSNR range value is larger, and a smaller clamp is scheduled for use when the computed OSNR range value is smaller.

The method further includes the steps of (vi) determining a clamped power adjustment value for each wavelength by multiplying each computed raw power adjustment value by the computed raw power adjustment correction factor, (vii) applying the corresponding determined clamped power adjustment value to each wavelength, and (viii) iterating steps (i) through (vii) until the computed OSNR range value is within pre-defined boundaries, whereby the signal is considered equalized.

In an aspect of the present invention, the raw power adjustment correction factor is computed by determining the largest magnitude computed raw power adjustment value, and dividing the scheduled clamp value by the determined largest magnitude computed raw power adjustment value.

The invention incorporates the use of large adjustments at the start of equalization, tapering off to fine adjustments in finishing equalization, thereby providing both fast and precise equalization.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, and accompanying drawings where:

FIG. 1 is an overview of a variable clamp equalization method according to an embodiment of the present invention;

DETAILED DESCRIPTION OF THE PRESENTLY PREFERRED EMBODIMENT

Figure 1A:
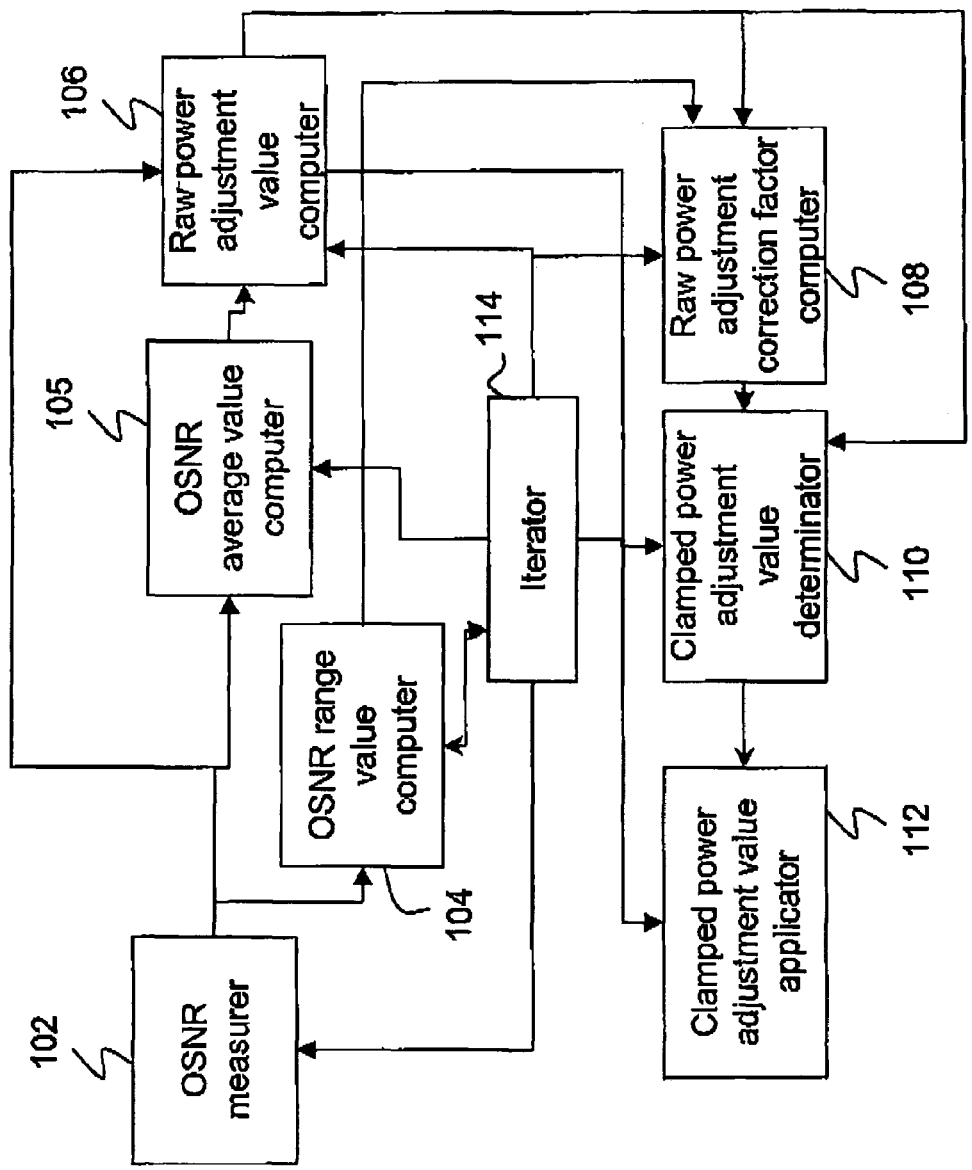
FIG. 1A is a schematic overview of a variable clamp equalization apparatus according to an embodiment of the present invention.

The presently preferred embodiment of the invention is directed to a variable clamp equalization method and apparatus. As shown in FIG. 1, the method includes the steps of measuring optical signal to noise ratio (OSNR) values for each wavelength 10, computing an OSNR range value of the measured OSNR values 12, computing an OSNR average value of the measured OSNR values 14, computing a raw power adjustment value for each wavelength by subtracting each wavelength's measured OSNR value from the computed OSNR average value 16, and computing a raw power adjustment correction factor for each computed raw power adjustment value based on the computed OSNR range value in accordance with a pre-defined variable clamp value schedule, wherein a larger clamp is scheduled for use when the computed OSNR range value is larger, and a smaller clamp is scheduled for use when the computed OSNR range value is smaller 18.

Figure 1B:
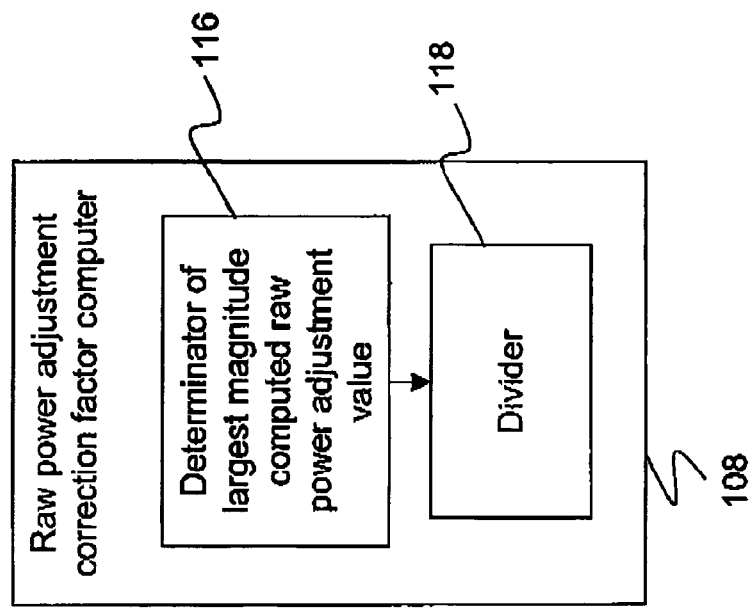
FIG. 1B is a schematic overview of a raw power adjustment correction factor computer.

Referring to FIG. 1A, the present invention may utilize a measurer 102 to measure the optical signal to noise ratio (OSNR) values for each wavelength; an OSNR range value computer 104 to compute an OSNR range value of the measured OSNR values, as well as an OSNR average value computer 105 to compute an OSNR average value of the measured OSNR values; a raw power adjustment value computer 106 to compute a raw power adjustment value for each wavelength by subtracting each wavelength's measured OSNR value from the computed OSNR average value; a raw power adjustment correction factor computer 108 to compute a raw power adjustment correction factor for each computed raw power adjustment value based on the computed OSNR range value in accordance with a pre-defined variable clamp value schedule, a larger clamp is scheduled for use when the computed OSNR range value is larger, and a smaller clamp is scheduled for use when the computed OSNR range value is smaller; a clamped power adjustment value determinator 110 to determine a clamped power adjustment value for each wavelength by multiplying each computed raw power adjustment value by the computed raw power adjustment correction factor. The corresponding determined clamped power adjustment value will then be applied to each wavelength by a clamped power adjustment value applicator 112. The process may be controlled by an iterator 114 to repeat file steps until the computed OSNR range value is within pre-defined boundaries, and the signal is considered equalized. Referring to FIG. 1B, the raw power adjustment correction factor computer 108 may further comprise a determinator 116 for determining the largest magnitude computed raw power adjustment value; and a divider 118 for dividing the scheduled clamp value by the determined largest magnitude computed raw power adjustment value.

The method further includes the steps of determining a clamped power adjustment value for each wavelength by multiplying each computed raw power adjustment value by the computed raw power adjustment correction factor 20, applying the corresponding determined clamped power adjustment value to each wavelength 22, and iterating steps 10 through 22 until the computed OSNR range value is within pre-defined boundaries, whereby the signal is considered equalized 24.

Figure 2:
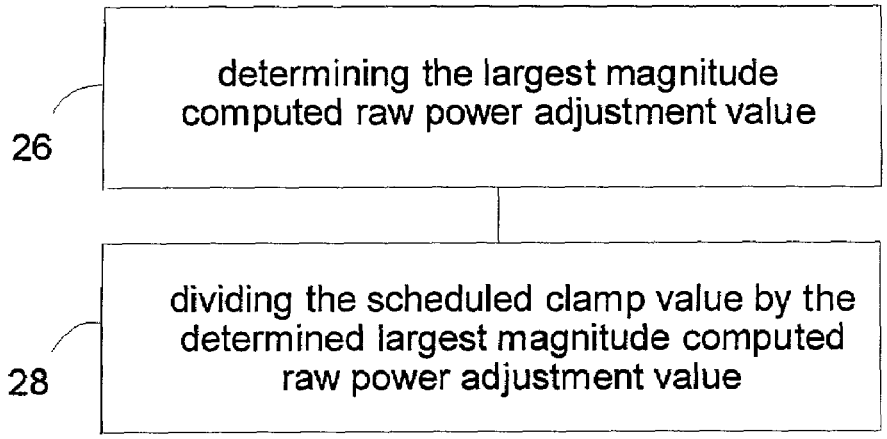
FIG. 2 shows an embodiment of the present invention for computing a raw power adjustment correction factor.

As shown in FIG. 2, in an embodiment of the present invention, the raw power adjustment correction factor is computed 18 by determining the largest magnitude computed raw power adjustment value 26, and dividing the scheduled clamp value by the determined largest magnitude computed raw power adjustment value 28.

Figure 3:
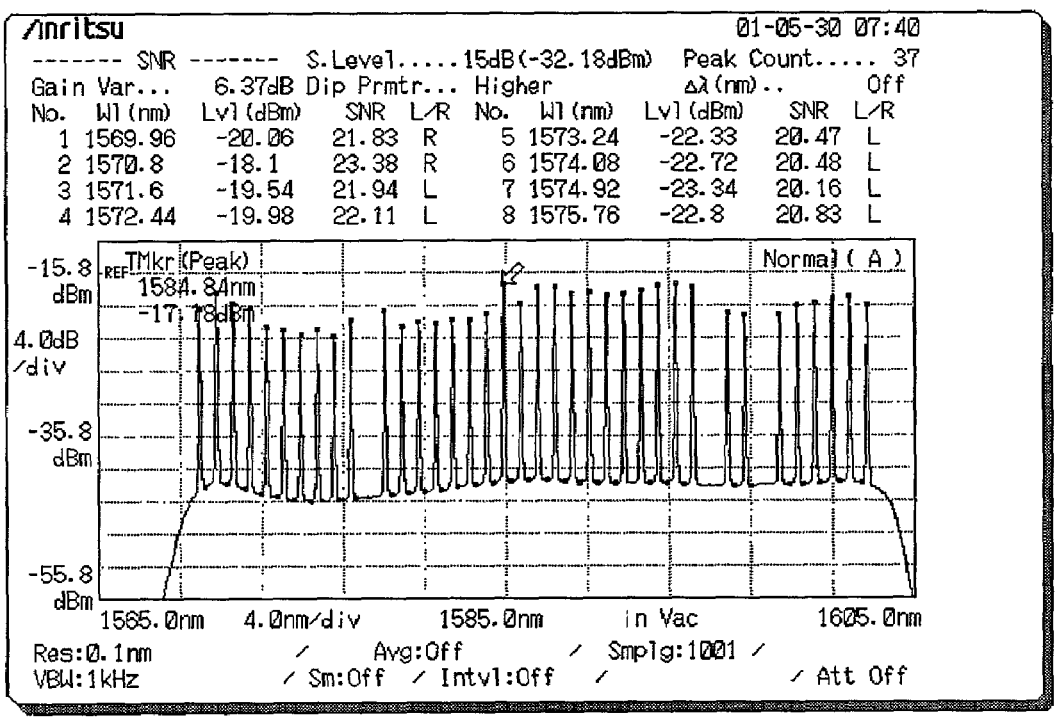
FIG. 3 is a graph of received wavelengths for a 600 km optical system before equalization.
Figure 4:
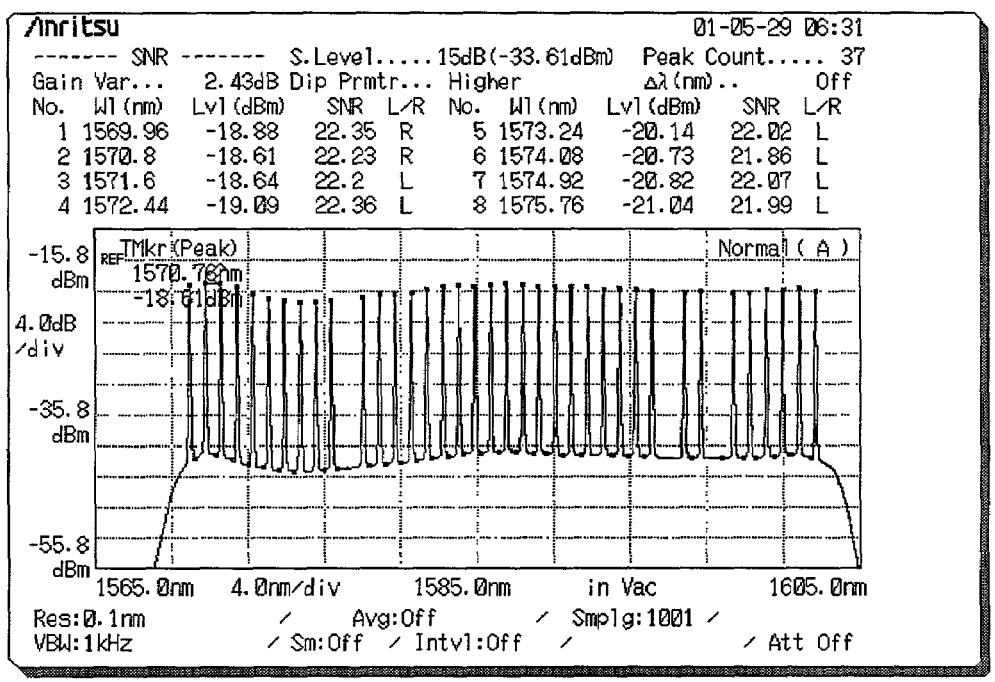
FIG. 4 is a graph of received wavelengths for a 600 km optical system after equalization.
Figure 5:
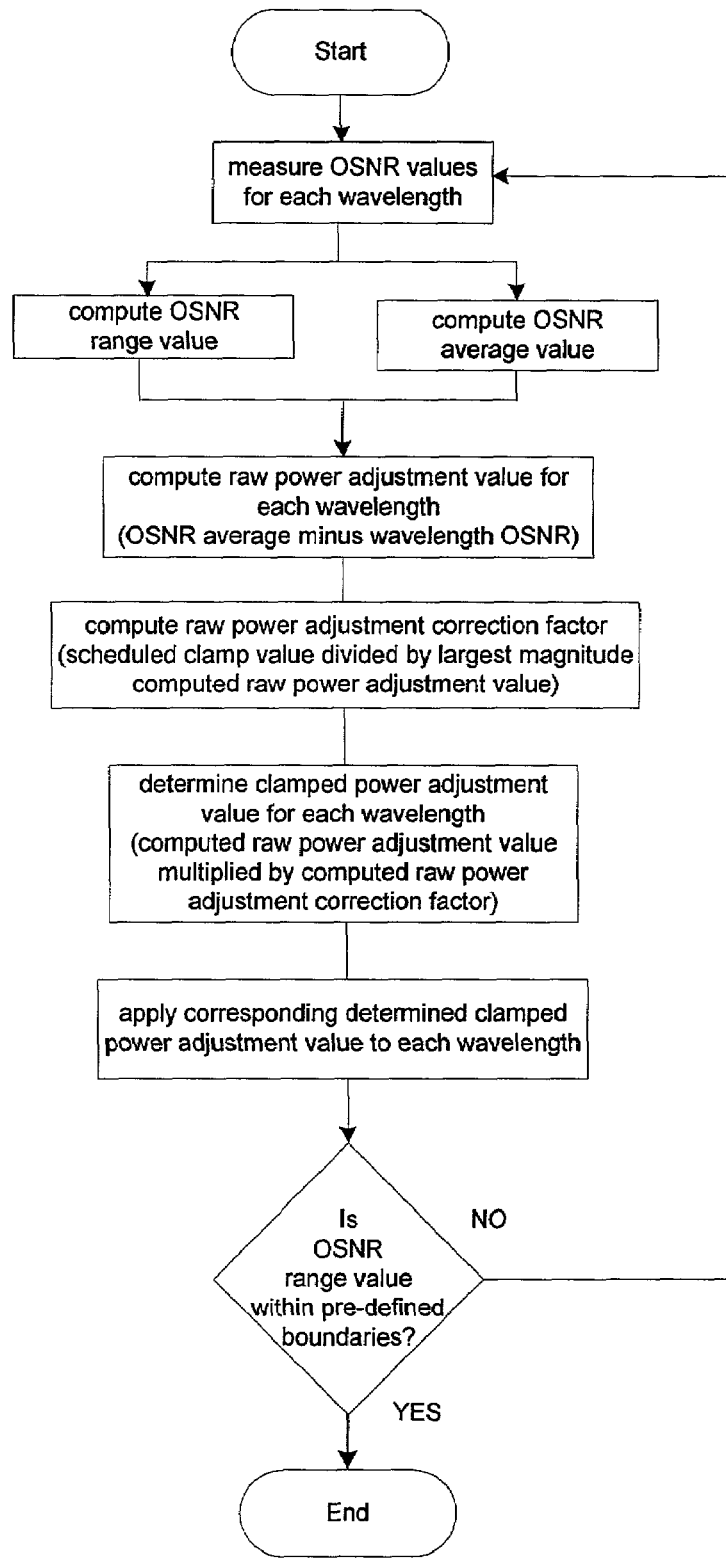
FIG. 5 is a flowchart of a variable clamp equalization method according to the present invention.

Equalizing a set of wavelengths is the process of making the optical signal to noise ratio (OSNR) of all wavelengths as even as possible. One criterion for use in determining how well equalized a system is, is to select the wavelengths with the highest and the lowest OSNR's, and compute the OSNR range. The smaller the range, the more equalized the signal. An example of a DWDM signal before and after equalization is shown in FIGS. 3 and 4.

While adjusting power levels for each wavelength within a DWDM signal, prior art clamping methods maintain power level adjustments within pre-defined fixed boundaries to equalize the system in a measured manner. The invention further measures the severity of OSNR levels to provide variable clamping tailored to the measured OSNR severity levels.

For example, as shown in Table A, in a system having five transmitters and five receivers, the signal may require three iterations to equalize. The first iteration uses a clamp of 4 dB, the second a clamp of 3 dB, and the third a clamp of 2 dB. In this example, assuming the second iteration is about to be applied with a clamp of 3 dB, a set of current transmitter powers is shown, with corresponding measured OSNR levels after 600 km of fiber.

TABLE A

| | Wavelength | | | | |
|---|---|---|---|---|---|
| | 1 | 2 | 3 | 4 | 5 |
| Power (dBm) | 1 | 0.5 | 2 | −3 | −2 |
| OSNR (dB) | 20 | 23 | 17 | 21 | 25 |

The OSNR average value is computed to be 21.2 dB. Raw power adjustment values, computed by subtracting measured OSNR values from the computed OSNR average value, are shown in Table B.

TABLE B

| | Wavelength | | | | |
|---|---|---|---|---|---|
| | 1 | 2 | 3 | 4 | 5 |
| Raw Power Adjustments (dB) | +1.2 | −1.8 | +4.2 | +0.2 | −3.8 |

With the scheduled clamp boundaries of +3.0 and −3.0 for this iteration, it can be seen that wavelengths 3 and 5 require clamping. Therefore, all computed raw power adjustment values have a computed raw power adjustment correction factor applied to bring wavelengths 3 and 5 within the scheduled clamp boundaries. The correction factor is computed by first determining the largest raw power adjustment magnitude. In this example, the magnitude of +4.2 is larger than the magnitude of −3.8, so that the correction factor applied to all wavelengths is the clamp value magnitude divided by the determined largest raw power adjustment magnitude, or 3 divided by 4.2, which equals 0.71. Therefore, a correction factor of 0.71 is applied to each raw power adjustment value, as shown in Table C.

TABLE C

| | Wavelength | | | | |
|---|---|---|---|---|---|
| | 1 | 2 | 3 | 4 | 5 |
| Raw Power Adjustments (dB) | +1.2 | −1.8 | +4.2 | +0.2 | −3.8 |
| Clamped Power Adjustments (dB) | +0.85 | −1.27 | +2.98 | +0.14 | −2.70 |

It can be observed that all adjustments are now "clamped" within −3 and +3 dB. These clamped power adjustments are then applied to the transmitters by being added to their current power level, as shown in Table D.

TABLE D

| | Wavelength | | | | |
|---|---|---|---|---|---|
| | 1 | 2 | 3 | 4 | 5 |
| Power (dBm) Before iteration 2 | 1 | 0.5 | 2 | −3 | −2 |
| Clamped Power Adjustments (dB) | +0.85 | −1.27 | +2.98 | +0.14 | −2.70 |
| Power After applying the adjustments of iteration 2 (dBm) | 1.85 | −0.77 | 4.98 | −2.86 | −4.70 |

The system has now been brought closer to an equalized state as the OSNR levels approach one another. In the above example, OSNR levels are then re-measured, and a further iteration is applied using a clamp value of 2 dB. If necessary, additional iterations are applied until all wavelength OSNR levels are within pre-defined boundaries.

The application of these transmitter adjustments will have a direct impact on the received OSNR levels for each wavelength after 600 km, changing the interaction between the wavelengths and the relative level of energy between them, in addition to affecting the way amplifiers distribute their pump power between wavelengths.

By incorporating the use of large adjustments at the start of equalization, tapering off to fine adjustments in finishing equalization, the invention provides both fast and precise equalization.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A variable clamp equalization method for a plurality of wavelengths in a signal, comprising the steps of:
   (i) measuring optical signal to noise ratio (OSNR) values for each wavelength;
   (ii) computing an OSNR range value of the measured OSNR values;
   (iii) computing an OSNR average value of the measured OSNR values;
   (iv) computing a raw power adjustment value for each wavelength by subtracting each wavelength's measured OSNR value from the computed OSNR average value;
   (v) computing a raw power adjustment correction factor for each computed raw power adjustment value based on the computed OSNR range value in accordance with a pre-defined variable clamp value schedule, wherein a larger clamp is scheduled for use when the computed OSNR range value is larger, and a smaller clamp is scheduled for use when the computed OSNR range value is smaller;
   (vi) determining a clamped power adjustment value for each wavelength by multiplying each computed raw power adjustment value by the computed raw power adjustment correction factor;
   (vii) applying the corresponding determined clamped power adjustment value to each wavelength; and
   (viii) iterating steps (i) through (vii) until the computed OSNR range value is within pre-defined boundaries, whereby the signal is considered equalized.

2. The method according to claim 1, wherein the raw power adjustment correction factor is computed by:
   (i) determining the largest magnitude computed raw power adjustment value; and
   (ii) dividing the scheduled clamp value by the determined largest magnitude computed raw power adjustment value.

3. A variable clamp equalization apparatus for a plurality of wavelengths in a signal, comprising:
   (i) means for measuring optical signal to noise ratio (OSNR) values for each wavelength;
   (ii) means for computing an OSNR range value of the measured OSNR values;
   (iii) means for computing an OSNR average value of the measured OSNR values;(iv) means for computing a raw power adjustment value for each wavelength by subtracting each wavelength's measured OSNR value from the computed OSNR average value;
   (v) means for computing a raw power adjustment correction factor for each computed raw power adjustment value based on the computed OSNR range value in accordance with a pre-defined variable clamp value schedule, wherein a larger clamp is scheduled for use when the computed OSNR range value is larger, and a smaller clamp is scheduled for use when the computed OSNR range value is smaller;
   (vi) means for determining a clamped power adjustment value for each wavelength by multiplying each computed raw power adjustment value by the computed raw power adjustment correction factor;
   (vii) means for applying the corresponding determined clamped power adjustment value to each wavelength; and
   (viii) means for iterating means (i) through (vii) until the computed OSNR range value is within pre-defined boundaries, whereby the signal is considered equalized.

4. The apparatus according to claim 3, wherein the means for computing the raw power adjustment correction factor further includes:
   means for determining the largest magnitude computed raw power adjustment value; and
   means for dividing the scheduled clamp value by the determined largest magnitude computed raw power adjustment value.

5. A computer readable medium storing a computer program implementing storing instructions or a variable clamp equalization method for a plurality of wavelengths in a signal the method comprising the steps of:
   (i) a processing portion for measuring optical signal to noise ratio (OSNR) values for each wavelength;
   (ii) computing an OSNR range value of the measured OSNR values;
   (iii) computing an OSNR average value of the measured OSNR values;
   (iv) computing a raw power adjustment value for each wavelength by subtracting each wavelength's measured OSNR value from the computed OSNR average value;
   (v) computing a raw power adjustment correction factor for each computed raw power adjustment value based on the computed OSNR range value in accordance with a pre-defined variable clamp value schedule, wherein a larger clamp is scheduled for use when the computed OSNR range value is larger, and a smaller clamp is scheduled for use when the computed OSNR range value is smaller;

(vi) determining a clamped power adjustment value for each wavelength by multiplying each computed raw power adjustment value by the computed raw power adjustment correction factor;

(vii) applying the corresponding determined clamped power adjustment value to each wavelength; and (viii) iterating processing portions (i) through (vii) until the computed OSNR range value is within pre-defined boundaries, whereby the signal is considered equalized.

6. The computer readable medium according to claim 5, wherein the raw power adjustment correction factor is computed by determining the largest magnitude computed raw power adjustment value; and dividing the scheduled clamp value by the determined largest magnitude computed raw power adjustment value.

* * * * *